United States Patent [19]

Martenas

[11] Patent Number: 4,678,130
[45] Date of Patent: Jul. 7, 1987

[54] QUICK ADJUST SHEAR BAR MECHANISM

[75] Inventor: Wayne B. Martenas, Brugge, Belgium

[73] Assignee: New Holland Inc., New Holland, Pa.

[21] Appl. No.: 784,391

[22] Filed: Oct. 4, 1985

[51] Int. Cl.$^4$ .............................................. B02C 18/16
[52] U.S. Cl. .................................... 241/222; 241/241; 241/286
[58] Field of Search .............................. 241/221–225, 241/239–241, 286, 287, 101.7

[56] References Cited

U.S. PATENT DOCUMENTS 3,419,055 12/1968 Schwalm et al. .
4,055,309 10/1977 Fleming et al. .
4,190,209 2/1980 deBuhr et al. .
4,295,616 10/1981 Hill .
4,436,248 3/1984 Lindblom et al. .
4,474,336 10/1984 Fleming .
4,506,839 3/1985 Black .

Primary Examiner—Timothy V. Eley
Attorney, Agent, or Firm—Larry W. Miller; Frank A. Seemar; Darrell F. Marquette

[57] ABSTRACT

An adjustable shear bar apparatus for a forage harvester is disclosed wherein a pair of levers pivotally supported to effect positional adjustments of the shear bar are mounted such that the pivot axis is located in an offset relationship relative to the axis of the shear bar. An upper clamping member detachably connected to a lower support mechanism by a threaded member positioned in line with the shear bar axis to clamp the shear bar therebetween connecting apparatus detachably affixing the shear bar to each of the levers includes a threaded fastener received through an opening extending through each lever and threadably engaged with the shear bar. The connecting apparatus also includes cupped washer assemblies to create a ball joint effect to facilitate the relative movement between the levers and the corresponding fasteners, permitting the shear bar to be moved linearly by a pair of pivotally movable levers.

14 Claims, 3 Drawing Figures

QUICK ADJUST SHEAR BAR MECHANISM

BACKGROUND OF THE INVENTION

The present invention relates generally to precision type forage harvesters utilizing knives mounted to a flywheel for cooperative action against a shearbar to chop crop material and, more particularly, to a quick adjust mechanism for facilitating the adjustment of the positional relationship between the shearbar and the movable knives.

Typically, quick adjust shearbar mechanisms utilize a mechanical linkage to move the position of the shearbar relative to the rotating knives. One such adjustable shearbar apparatus can be seen in U.S. Pat. No. 4,436,248, granted on March 13, 1984, to Curtis H. Lindblom et al.

The problems encountered in such shearbar adjustment mechanisms, i.e., mechanisms in which the mechanical linkage induces movement of a clamped in place shearbar, involve bowing of a shearbar, torque fluctuations encountered in the shearbar clamping bolt, and difficulties in the serviceability due to the general complexity of the adjustment mechanism. Accordingly, it would be advantageous to provide a shearbar adjustment mechanism that would improve serviceability, decrease torque fluctuations and improve bowing problems in the shearbar.

SUMMARY OF THE INVENTION

It is an object of this invention to overcome the aforementioned disadvantages of the prior art by providing a quick adjust shearbar mechanism for a forage harvester.

It is another object of this invention to offset the pivotal connection between adjustment levers and a shearbar support member relative to the axis of the shearbar.

It is a feature of this invention that the offset lever pivot axis permits the levers to be positioned closer to the cutterhead chamber, thus reducing the span between the levers.

It is an advantage of this invention that the reduced span between adjustment levers reduces shearbar deflections.

It is another feature of this invention that the upper support mechanism is detachably connected to the lower support mechanism by threaded members positioned in line with the shearbar axis.

It is another advantage of this invention that the shearbar is positionally clamped between upper and lower support mechanisms.

It is yet another object of this invention to provide an opening extending through each lever to permit the passage of a threaded fastener to connect the shearbar with the lever.

It is yet another feature of this invention that the opening through each respective lever is larger than the corresponding fastener.

It is still another advantage of this invention that the opening through each lever can accommodate relative movement between the threaded fastener and the lever when pivotal movement of the lever induces a linear movement of the shearbar.

It is still another object of this invention to provide a ball joint assembly in the connection of the shearbar to the levers to facilitate the relative movement between the levers and the corresponding fasteners while permitting the shearbar to be tightly clamped against the levers.

It is yet another advantage of this invention that the accuracy of the shearbar adjustment is improved to provide better machine operating efficiency.

It is a further advantage of this invention that shearbar clamp bolt torque fluctuations are reduced.

It is a further object of this invention to provide a quick adjust shearbar mechanism for a forage harvester which is durable in construction, inexpensive of manufacture, facile in assemblage, and simple and effective in use.

These and other objects, features and advantages are accomplished according to the instant invention by providing an adjustable shear bar apparatus for a forage harvester wherein a pair of levers pivotally supported to effect positional adjustments of the shear bar are mounted such that the pivot axis is located in an offset relationship relative to the axis of the shearbar. An upper clamping member is detachably connected to a lower support mechanism by a threaded member positioned in line with the shear bar axis to clamp the shear bar therebetween. Connecting apparatus detachably affixing the shear bar to each of the levers includes a threaded fastener received through an opening extending through each lever and threadably engaged with the shear bar. The connecting apparatus also includes cupped washer assemblies to create a ball joint effect to facilitate the relative movement between the levers and the corresponding fasteners, permitting the shear bar to be moved linearly by a pair of pivotally movable levers.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
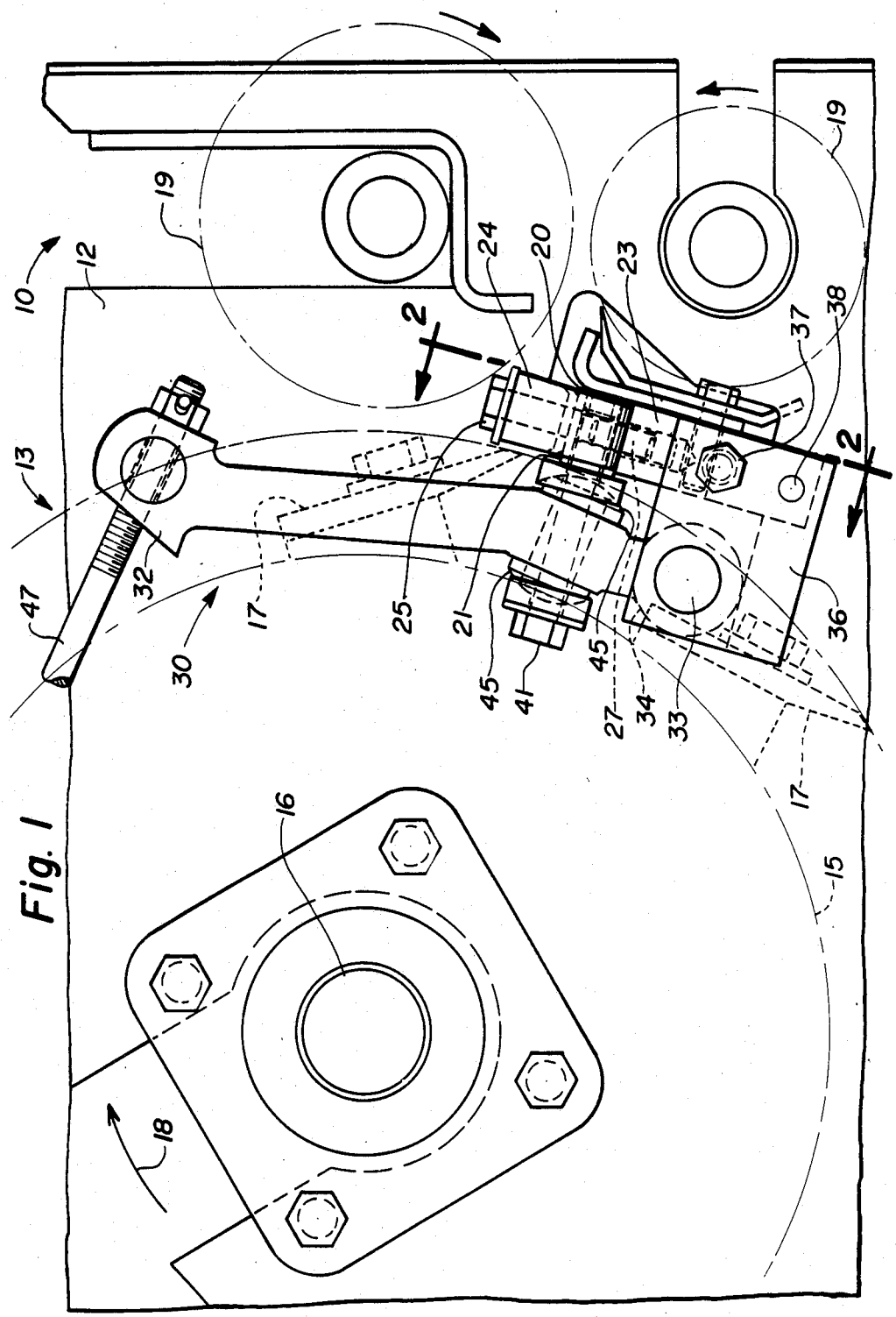
FIG. 1 is a partially side elevational view of a cutterhead assembly for a forage harvester, incorporating the principles of the instant invention.

Referring now to the drawings and, particularly to FIG. 1, a partial side elevational view of a cutterhead assembly for a forage harvester, such as shown in U.S. Pat. No. 4,436,248, issued on March 13, 1984, to Curtis H. Lindblom et al, the description of which is hereby incorporated herein by reference, can be seen. The forage harvester 10 includes a side sheet 12 which at least partially defines a cutterhead chamber 13 and rotatably supports a cutterhead 15 for rotation about an axis of rotation 16. The cutterhead 15 is provided with a plurality of knives 17 detachably affixed thereto in a conventional manner about the circumference of the cutterhead 15 for rotation in the direction indicated by arrow 18. A pair of feed rolls 19 feed a mat of crop material over a shearbar 20 positioned in a cooperative relationship with the rotating knives 17 to affect a comminuting of the mat of crop material by the shearing action between the knives 17 and the shearbar 20.

Figure 2:
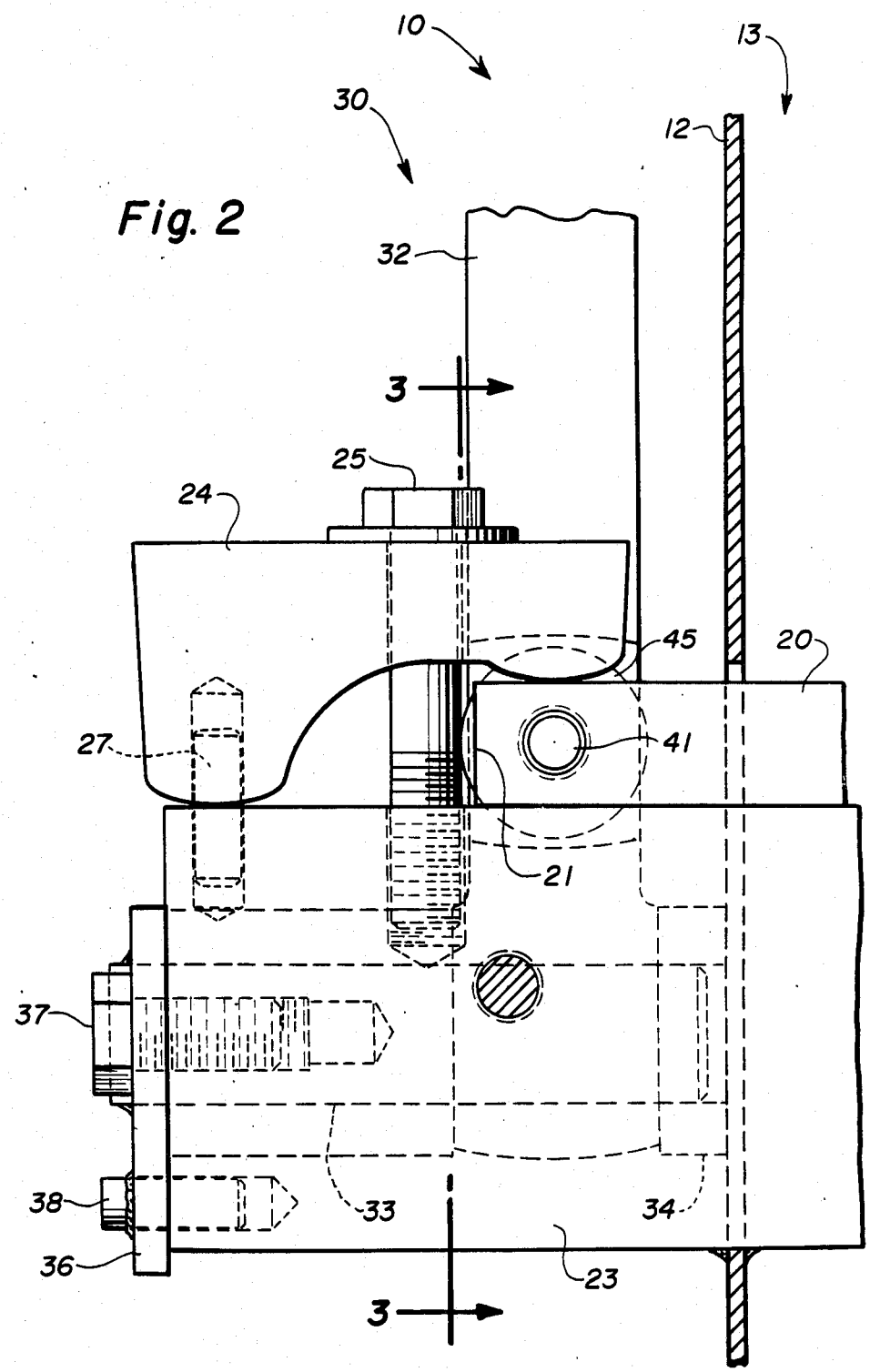
FIG. 2 is a partial cross-sectional view taken along lines 2—2 of FIG. 1 to show the apparatus for positionally supporting the shearbar.
Figure 3:
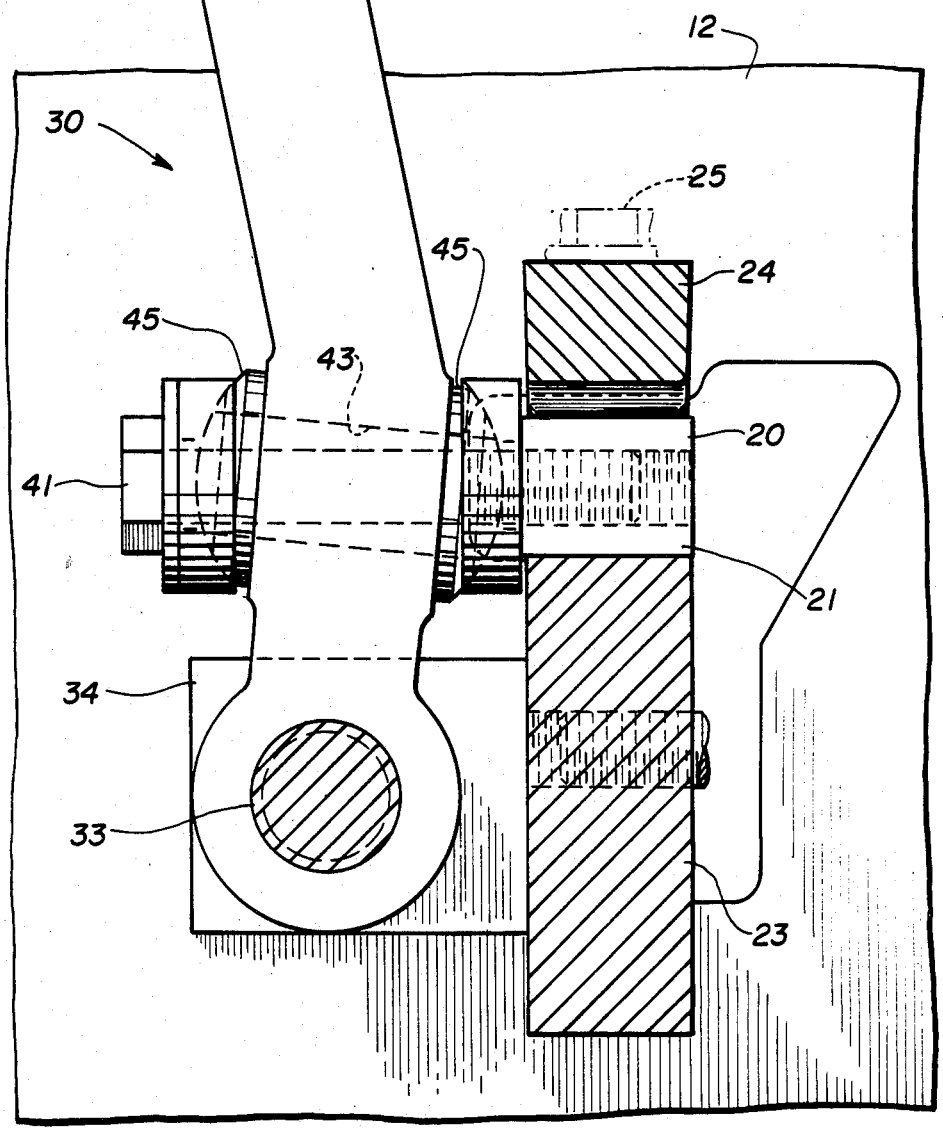
FIG. 3 is an enlarged partial cross-sectional view of the shearbar support apparatus taken along lines 3—3 of FIG. 2.

Referring now to FIGS. 1–3, the elongated shearbar 20 extends across the entire transverse width of the cutterhead 15 and is supported at either end 21 exteriorly of the side sheet 12 by a lower support member 23 and an upper clamping member 24. The end 21 of the shearbar 20 is clamped between the upper clamping member 24 and the lower shearbar support member 23 by a clamp bolt 25 extending through the upper clamping member 24 and threadably engaged with the lower support member 23. A dowel 27 positionally retains the upper support member 24 relative to the lower support member 23. Both the clamp bolt 25 and the dowel 27 at each end 21 of the shearbar 20 are positioned in line with the transverse axis of the shearbar 20.

The adjustment mechanism 30 includes a lever 32 pivotally supported on each respective side sheet 12 about a pivot member 33 defining a pivot axis. The pivot member 33 is supported by a collar 34 affixed to the respective side sheet 12 and a bracket 36 detachably affixed to the lower support member 23 by a fastener 37 and a positioning pin 38. The levers 32 are then pivotally movable in generally a fore-and-aft direction generally parallel to and along the exterior of the side sheet 12.

Each respective lever 32 is connected to the corresponding end 21 of the shearbar 20 by a capscrew 41 extending through an oversized opening 43 in the levers 32 into a threaded engagement with the corresponding end 21 of the shearbar 20. As best seen in FIG. 3, a pair of cooperable cup and ball washers 45 positioned on opposing sides of the respective levers 32 give a "ball joint" affect to permit a positional rotation of the levers 32 relative to the corresponding capscrews 41, allowing a generally linear motion of the shearbar 20 and engaged capscrews 41 while the levers 32 are pivoted about their pivot members 33 defining the pivot axis thereof rearwardly of the shearbar 20.

As best seen in FIG. 1, manipulation of the actuation linkage 47 causes a pivotal movement of the levers 32 about the pivot members 33. The relative rotative movement between the cup and ball washer assemblies 45, creating a ball joint effect, permits the lever 32 to be rotatably moved about the pivot member 33 while affecting a substantially linear motion of the shearbar 20 between the upper and lower support members 24,23 by pulling on the capscrew 41. This motion permits a positional adjustment of the shearbar 20 relative to the rotating knives 17 to selectively acquire the proper cooperation therebetween for affecting the most efficient chopping of crop material fed by the feed rolls 19. The positioning of the pivot members 33 for the levers 32 rearwardly of the lower shearbar support members 23 allows the levers 32 to be moved toward the cutterhead sidesheet 12 and thereby reducing the span between the two levers 32 and thus reducing possible shearbar deflections.

Furthermore, with the levers 32 pivotally positioned as described above, the upper clamping members 24 can be positioned so that the clamping load exerted thereby on the shearbar is directly in line with the fore-and-aft pivotal motion of the levers 32, eliminating any bending moment creating from heretofore known offset clamping positions. The positioning of the upper clamping members 24 so that the clamping load is in line with the levers 32, minimizes torque variations on the clamp bolts 25 because the shearbar 20 and the upper clamping member 24 are both supported on the lower shearbar support 23. The positioning of the levers 32 behind the lower shearbar support 23 permits a connection between the shearbar 20 and the lever 32 to be accomplished with a single capscrew on each side of the cutterhead 15. This capscrew 41 clamps the shearbar 20 against ball joint effect washer assemblies 45 to allow the lever 32 to rotate while the shearbar 20 moves linearly. This simple clamp arrangement allows for easier shearbar removal for replacement or turning.

It will be understood that changes to the details, materials, steps and arrangement of parts which have been described and illustrated to explain the nature of this invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In an adjustable shearbar apparatus for a forage harvester having spaced opposing side sheets; an elongated shearbar having opposing sides and an elongated axis extending between opposing ends; lower support means for supporting the shearbar, said lower support means being an elongated support member extending between and connected to said side sheets; upper clamping means associated with said lower support means for urging said shearbar against said lower support means adjacent opposite ends of said shearbar; a pair of levers pivotally movable relative to said elongated support member; connection means detachably affixing said shearbar to each of said levers; and means for pivoting said levers to move said shearbar linearly relative to said lower support means, said means for pivoting including an adjustment linkage coupled directly to said levers, the improvement comprising:

said connection means including a threaded fastener received through an opening extending through each said lever and threadably engaged with said shearbar, the pivotal connection between said levers and said elongated support member being located in an offset relationship relative to said shearbar axis; and said upper clamping means being detachably connected to said lower support means by threaded members positioned in line with said shearbar axis, said shearbar being clamped between said upper clamping means and lower support means.

2. The shearbar apparatus of claim 1 wherein the opening through each said lever is larger than the corresponding threaded fastener to accommodate relative movement therebetween when pivotal movement of said levers induces linear movement of said shearbar.

3. The shearbar apparatus of claim 2 wherein said connection means further includes a cup and ball washer assembly to facilitate the relative movement between the levers and the corresponding fasteners while permitting the shearbar to be clamped tightly against said levers.

4. In a shearbar apparatus for a forage harvester having spaced opposing side sheets; an elongated shearbar having opposing sides and a transverse axis extending between opposing ends; lower support means for supporting the shearbar, said lower support means being an elongated support member extending between and connected to said side sheets; upper clamping means associated with said lower support means for urging said shearbar against said lower support means adjacent opposite ends of said shearbar; a pair of levers pivotally movable relative to said elongated support member; connection means detachably affixing said shearbar to each of said levers; and means for pivoting said levers to move said shearbar linearly relative to said lower support means, said means for pivoting including adjustment members coupled directly to said levers, the improvement comprising:

each said lever having ball joint means having an opening extending therethrough in register with said shearbar;

said connection means including a threaded fastener received through each said opening for a threaded engagement with said shearbar to permit said shearbar to be positionally fixed relative to said ball joint means, each said opening being larger than the corresponding fastener to accommodate relative motion between the pivotable levers and the linearly movable shearbar and said fasteners engaged therewith.

5. The shearbar apparatus of claim 4 wherein the pivot axis of said levers is located in an offset relationship relative to said shearbar axis.

6. The shearbar apparatus of claim 5 wherein said upper clamping means is detachably connected to said lower support means by threaded member positioned in line with said shearbar axis, said shearbar being clamped between said upper clamping means and lower support means.

7. The shearbar apparatus of claim 6 wherein each said lever is mounted on a pivot member defining said pivot axis, each said pivot member being at least partially supported by said lower support means rearwardly of the transverse axis of said shearbar.

8. The shearbar apparatus of claim 7 wherein said ball joint means comprises a pair of cup and ball washer assemblies positioned on either side of said lever.

9. A shearbar apparatus for a forage harvester having opposing side sheets comprising:

an elongated shearbar having opposing ends and an elongated axis extending therebetween;

an elongated lower support member connected to said side sheets and extending therebetween beneath said shearbar;

upper clamping members connected to said lower support member adjacent said shearbar ends and engageable with said shearbar ends to urge said shearbar against said lower support member;

a pair of levers pivotally mounted proximate to said lower support member for pivotal movement relative thereto, each said lever being positioned adjacent a corresponding shearbar end and including ball joint means having an opening passing therethrough in register with said shearbar;

a cap screw received through the openings in each said ball joint means and threadably engaged with said shearbar, said cap screws being operable to positionally fix the shearbar relative to said ball joint means, said openings being larger than said corresponding cap screws; and means for pivotally moving said levers to effect a linear movement of said shearbar relative to said lower support member, said ball joint means and said openings accommodating the relative motions between the pivotally moving levers and the linearly moving shearbar and engaged cap screws.

10. The shearbar apparatus of claim 9 wherein said levers are at least partially supported by said lower support member such that said pivot axis is positioned offset to and rearwardly of the shearbar axis.

11. The shearbar apparatus of claim 10 wherein said upper clamping members are detachably connected to said lower support member by threaded members, said shearbar being clamped between said upper clamping members and lower support members to prevent movement thereof away from said lower support member.

12. The shearbar apparatus of claim 11 wherein said threaded members are positioned in line with said shearbar axis.

13. The shearbar apparatus of claim 12 wherein said ball joint means comprise cup and ball washer assemblies positioned on either side of said levers in register with the corresponding opening.

14. The shearbar apparatus of claim 12 wherein said cap screws are positioned in line with the pivotal movement of the corresponding said lever.

* * * * *